Patented Nov. 27, 1951

2,576,793

UNITED STATES PATENT OFFICE 2,576,793

WELDING TITANIUM AND OTHER METAL

James Fernando Jordan, Huntington Park, Calif.

No Drawing. Application September 20, 1950,
Serial No. 185,909

5 Claims. (Cl. 219—10)

My invention relates to the welding of titanium and other metals.

Conventional welding processes do not yield acceptable results when employed in welding titanium. The inert gas-arc welding process yields the best results, due to the protection that the inert gas curtain affords the welding operation against the oxygen and nitrogen content of the air. However, even with the inert gas-arc process, the junction alloy between the weldment and the parent metal is brittle. It seems clear that this brittleness is due to the oxidation products which form on the surfaces of the parent metal and the filler metal even at room temperature—such oxidation products being the oxide and nitride of titanium, together with the oxidation products of such other alloying elements that may be present in the titanium metal—the oxides of silicon, aluminum, or chromium, for example. Being inert, the gas curtain of the inert gas-arc techniques naturally has no effect on these surface compounds, and, accordingly, such compounds are free to enter the weld, and, even though their percentage may be quite low, brittleness results.

I have found a welding procedure whereby the welding operation may be protected against the adverse effects of exposure to air and against the adverse effects of the mentioned surface compounds. In my welding procedure, I carry out the welding operation under a curtain of gas that is, or contains, the reactive gas, carbon tetrachloride.

In one form of my process, I merely substitute carbon tetrachloride gas for the inert gas in the aforementioned inert gas-arc welding process. The carbon tetrachloride gas, being quite heavy, acts as a blanket over the welding operation in a manner similar to the inert gas. In addition, the carbon tetrachloride reacts with the surface compounds in a manner similar to the following:

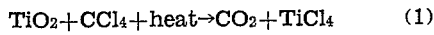  (1)

  (2)

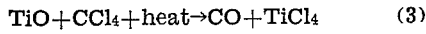  (3)

Instead of substituting carbon tetrachloride for all of the inert gas of the inert gas-arc process, my process may be carried out by substituting carbon tetrachloride for only a part of the inert gas; that is, by employing a mixture of gases consisting of carbon tetrachloride and one or more inert gases—such as, helium and/or argon, for example.

Zirconium may be welded under a reactive gas blanket consisting of or containing carbon tetrachloride.

Other metals may be welded by my process; for example, when it becomes desirable to protect the welding operation against the action of the air and it is desirable to volatilize the oxidation products instead of fluxing them, my process may be employed to advantage. For example, aluminum, stainless steel, molybdenum, brass and bronze, etc. may be advantageously welded with my process.

In addition to the arc welding process, my reactive gas blanket may be employed to protect and clean the parent metal in those welding processes known as spot welding and seam welding. In these cases, as with the arc welding process, a gas consisting of either carbon tetrachloride or carbon tetrachloride and an inert gas or gases is caused to displace the air that lies in contact with the area that is to be welded and this air displacement with my reactive gas is maintained until the welding operation is completed.

Due to the toxic character of carbon tetrachloride, the welder must be protected against the compound. This may be done by providing the welder with a suitable gas mask, or by locating an exhauster beneath the welding table so that the excess tetrachloride gas flows off of the welding table and down into the exhauster—and so, away from the welder. The excess tetrachloride may be recovered by connecting the exhauster to condensing arrangements.

While the tetrachloride may be directed at the welding area as a mist—by either a simple spraying head or by first passing the inert gas thru liquid carbon tetrachloride—the preferred arrangement is to convert the liquid tetrachloride into gas and then direct said gas at the welding area. This may be done by generating the tetrachloride gas with a still.

In certain tests which I made, the addition of dry HCl to the CCl₄ seemed to improve the action of the reactive blanket; furthermore, certain other tests indicated the possibility that dry HCl could be substituted for CCl₄ as the reactive agent in my reactive blanket, especially if said dry HCl contained a small amount of CCl₄—the CCl₄ apparently acting as a catalytic agent.

The electric arc is employed in a number of welding procedures; for example, in spotwelding, seam welding, resistance flash buttwelding and inert gas-arcwelding. My reactive gas atmosphere may be employed in any of these welding processes. Accordingly, the expression "electric arc" is employed in my claims to denote those welding processes wherein an electric arc is employed to supply the heat required for the fusion.

Having now described several forms of my invention, I wish it to be understood that my invention is not to be limited to the specific form or arrangement of steps hereinbefore described, except insofar as such limitations are specified in the appended claims.

I claim as my invention:

1. The welding process, which comprises: contacting the preheated surface of the metal that is to be welded with gas selected from the group consisting of carbon tetrachloride, hydrogen chloride, and mixtures thereof until reaction between said gas and oxygen-bearing compounds on said surface has volatilized a substantial portion of said compounds; and welding under a blanket of said gas.

2. The welding process, which comprises: contacting the preheated surface of the metal that is to be welded with gaseous carbon tetrachloride until reaction between said gas and oxygen-bearing compounds on said surface has volatilized a substantial portion of said compounds; and welding under a blanket of said gas.

3. The process according to claim 2 in which said gaseous carbon tetrachloride is diluted with a gas that is substantially inert towards said metal.

4. The welding process, which comprises: contacting the preheated surface of the metal that is to be welded with hydrogen chloride gas until reaction between said gas and oxygen-bearing compounds on said surface has volatilized a substantial portion of said compounds; and welding under a blanket of said gas.

5. The process according to claim 4 in which said hydrogen chloride gas is diluted with a gas that is substantially inert towards said metal.

JAMES FERNANDO JORDAN.

REFERENCES CITED

The following references are of record in the file of this patent:

UNITED STATES PATENTS

| Number | Name | Date |
|---|---|---|
| 1,806,121 | Siebs | May 19, 1931 |
| 1,827,210 | Siebs | Oct. 13, 1931 |
| 2,053,417 | Brace | Sept. 8, 1936 |
| 2,168,185 | Alexander | Aug. 1, 1939 |

OTHER REFERENCES

Roscoe and Schorlemmer: "Treatise on Chemistry," vol. II, pp. 796–799, 807–809.